(12) United States Patent
Chapman et al.

(10) Patent No.: US 9,486,072 B1
(45) Date of Patent: Nov. 8, 2016

(54) LAP SUPPORT DEVICE

(71) Applicant: May Designs LLC, Bend, OR (US)

(72) Inventors: Brent R. Chapman, Bend, OR (US); Jennifer M. Chapman, Bend, OR (US)

(73) Assignee: MAY DESIGNS LLC, Bend, OR (US)

( * ) Notice: Subject to any disclaimer, the term of this patent is extended or adjusted under 35 U.S.C. 154(b) by 0 days.

(21) Appl. No.: 14/705,711

(22) Filed: May 6, 2015

(51) Int. Cl.
*A47B 23/00* (2006.01)
*A47B 37/00* (2006.01)
*A47B 13/08* (2006.01)
*A01K 29/00* (2006.01)

(52) U.S. Cl.
CPC ............... *A47B 37/00* (2013.01); *A01K 29/00* (2013.01); *A47B 13/083* (2013.01)

(58) Field of Classification Search
CPC .. A47B 23/041; A47B 37/00; A47B 13/083; A01K 29/00
USPC ............................................. 108/43, 25, 26
See application file for complete search history.

(56) References Cited

U.S. PATENT DOCUMENTS

| | | | | |
|---|---|---|---|---|
| 160,455 A * | 3/1875 | Mitchell | ............... | A47B 23/002 108/43 |
| 492,316 A * | 2/1893 | White | ............... | A47B 3/10 108/43 |
| 4,052,944 A * | 10/1977 | Jennings | ............ | A47G 23/0608 108/43 |
| 4,235,472 A * | 11/1980 | Sparks | ............... | A45C 9/00 108/43 |
| 4,700,634 A * | 10/1987 | Mills | ............... | A47B 23/002 108/43 |
| 4,790,041 A * | 12/1988 | Shtull | ............... | A47D 5/00 108/43 |
| 5,081,936 A * | 1/1992 | Drieling | ............... | B60N 3/002 108/25 |
| 5,680,973 A * | 10/1997 | Vulpitta | ............... | A45C 9/00 108/43 |
| 5,732,910 A * | 3/1998 | Martin | ............... | A47B 21/0314 108/43 |
| 5,765,790 A * | 6/1998 | Kuldvere | ............... | G06F 3/0395 108/43 |
| 6,050,200 A * | 4/2000 | Sullins | ............... | A47B 23/002 108/25 |
| 6,529,369 B1 * | 3/2003 | Zarek | ............... | G06F 1/1616 108/43 |
| 6,986,308 B1 * | 1/2006 | King | ............... | A47G 23/0608 108/25 |
| 7,055,442 B2 * | 6/2006 | Podd | ............... | A47B 23/001 108/25 |
| 7,249,747 B2 * | 7/2007 | Marceau | ............... | A47B 23/002 108/43 |
| 7,275,724 B1 * | 10/2007 | Ward | ............... | A47B 23/002 108/43 |
| D563,058 S | 2/2008 | Lamstein et al. | | |
| 7,921,807 B2 | 4/2011 | Arvanites | | |
| 8,539,909 B2 | 9/2013 | Williams | | |
| 8,635,959 B1 * | 1/2014 | Silknitter | ............ | A47G 23/0608 108/159.12 |
| 8,807,051 B2 * | 8/2014 | Johnson | ............... | A47G 9/1045 108/25 |
| 2003/0066489 A1 | 4/2003 | Whitehill | | |
| 2004/0261668 A1 * | 12/2004 | Jarke | ............... | B82Y 30/00 108/43 |
| 2005/0092212 A1 * | 5/2005 | Simon | ............... | A47B 23/00 108/43 |
| 2005/0211138 A1 * | 9/2005 | Gupta | ............... | D04D 1/04 108/43 |
| 2006/0138297 A1 * | 6/2006 | Esimai | ............... | A47B 23/002 248/346.01 |
| 2010/0307385 A1 * | 12/2010 | Raney | ............... | A47B 23/042 108/43 |
| 2012/0060724 A1 * | 3/2012 | Doss | ............... | G06F 1/1632 108/43 |
| 2012/0160136 A1 * | 6/2012 | Lineal | ............... | A47B 23/04 108/43 |
| 2012/0291711 A1 | 11/2012 | Baker et al. | | |

* cited by examiner

*Primary Examiner* — Jose V Chen
(74) *Attorney, Agent, or Firm* — Leber Patent Law P.C.

(57) ABSTRACT

Devices are provided that can be positioned on a user's lap and, when so positioned, provide a stable, comfortable surface to support a pet. The devices include a resilient body configured to be positioned around the user's thighs and having a central supporting surface.

21 Claims, 10 Drawing Sheets

US 9,486,072 B1

LAP SUPPORT DEVICE

BACKGROUND

While it is enjoyable to hold a pet on one's lap, doing so can make one feel hot, or can result in pet fur/hair on one's clothes. In some cases, e.g., if the animal becomes frightened, the person holding the animal may be scratched and/or the pet or the person holding it can be injured. It is also sometimes necessary to hold the animal in place.

SUMMARY

The present disclosure features devices that can be positioned on a user's lap and, when so positioned, provide a stable, comfortable surface to support a pet.

In one aspect, the disclosure features a device that includes a body, formed of a resilient material, the body comprising (a) a central support portion having an upper surface that includes a generally planar region, and a lower surface, and (b) a pair of wing portions, disposed on opposite sides of the central supporting portion. The lower surface of the central support portion and inner surfaces of the wing portions define a generally U-shaped cavity dimensioned to be positioned over a user's thighs.

Some implementations include one or more of the following features.

The body may further include a rim extending around a circumference of the central support portion. The rim may extend, for example, at least 10 mm from the upper surface. The rim may define a recessed area, and the device may further include a topper configured to be positioned in the recessed area. The topper may be of a flexible or rigid material.

The resilient material may be or include a foam, for example a polyurethane foam. In some cases, the foam may have a foam density of from about 3 to 4 pounds per cubic foot, and a firmness of from about 40 to 60 IFD.

In some implementations, the wing portions have a length of at least 5 cm. The central support portion may have a thickness, measured from the upper surface to the lower surface, of at least 25 mm. The upper surface of the central support portion may include a curved edge. The device may further include a wedge element removably mounted on the lower surface of the central support portion.

In some cases, the body further includes a plurality of heat-dissipating channels, which may be positioned to align with the tops of a user's thighs when the device is in use.

In another aspect, the disclosure features methods of using the devices described herein. For example, the disclosure features a method that includes (a) positioning a device on the lap of a human, the device comprising a body, formed of a resilient material, the body comprising (i) a central support portion having an upper surface that includes a generally planar region, and a lower surface; and (ii) a pair of wing portions, disposed on opposite sides of the central supporting portion; wherein the lower surface of the central support portion and inner surfaces of the wing portions define a generally U-shaped cavity that us positioned over the human's thighs; and (b) positioning an animal on the upper surface of the central support portion.

In some implementations, the method further includes placing a topper in a recessed area of the upper surface prior to positioning the animal on the upper surface. The method may also include removably attaching a wedge to the lower surface of the central support portion and placing the wedge between the thighs of the human.

DETAILED DESCRIPTION

The lap support devices described herein allow a user to have a small pet (e.g., lap dog, cat, ferret, rabbit, rat, mouse, hamster, snake, etc.) on the user's lap without the pet being directly on the user's legs. The device provides a stable platform for the pet to rest on and be close to the person, without the person having to hold the pet in place. As a result, the user can perform a task, such as knitting or typing, with the pet on his or her lap. The device also protects the user's clothing from the pet's shedding hair or fur, and eliminates the risk of the user's lap being clawed by the pet. As will be discussed further below, the device can be removed from the person's lap without disturbing the pet, and placed on a surface where the device will function as a pet bed for the animal.

Figure 1:
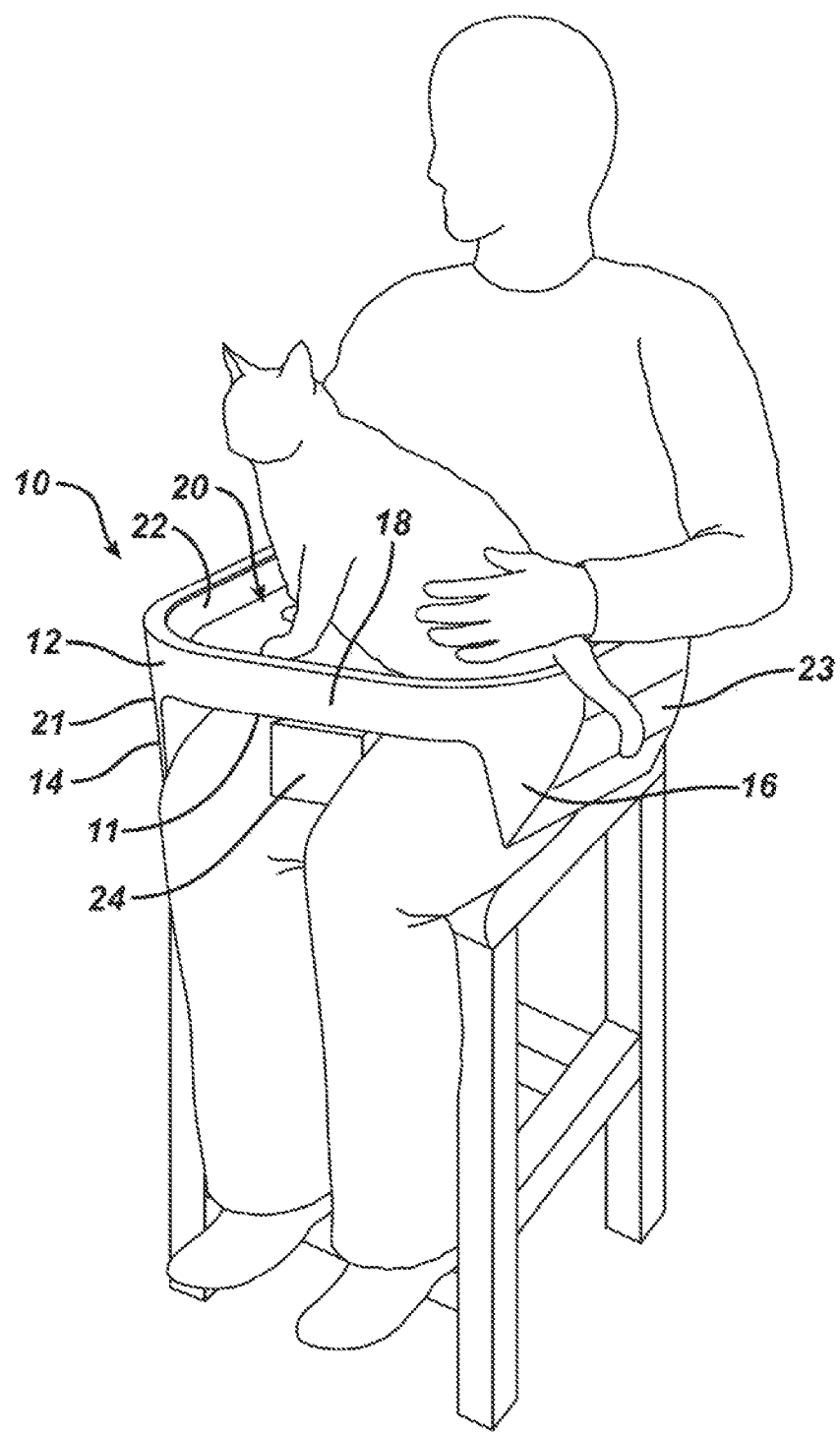
FIG. 1 is a diagrammatic view of a lap support device according to one embodiment, in use on a person's lap.

Referring to FIG. 1, lap support device 10 includes a body 12 (shown in detail in FIG. 2) having a pair of wing portions 14, 16 that are positioned on either sides of the legs of a user, and a central support portion 18 that extends across the user's lap. The central support portion has a front edge 17, disposed closer to the user's knees during use, a rear edge 19 disposed closer to the user's torso, and a lower surface 11 that is generally in contact with the user's thighs.

Figure 3:
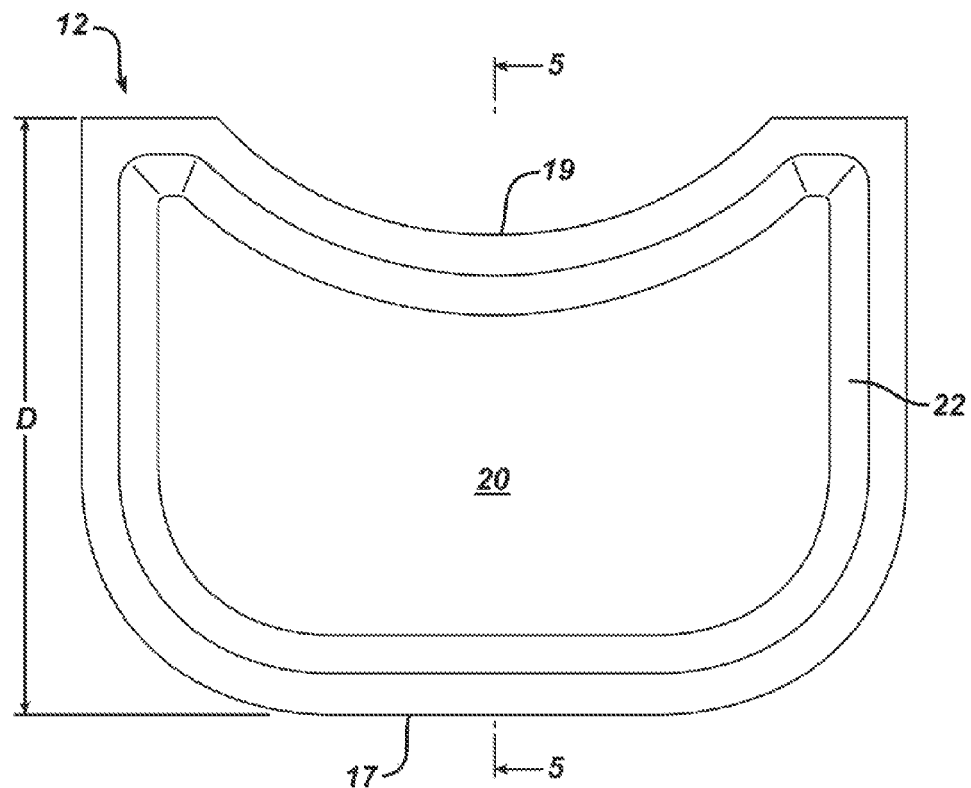
FIGS. 3 and 4 are top and front views, respectively, of the lap support device shown in FIG. 2.

The central support portion 18 will generally have a length $L_c$ (FIG. 4) of from about 30 to 70 cm, for example, 40 to 50 cm, to accommodate the hip width of most users. The central support portion may have a depth D (FIG. 3), measured as the longest distance between edges 17 and 19, of from about 35 to 45 cm, which is generally slightly less than or equal to the length of the user's thighs. These dimensions provide adequate room for most small pets, i.e., pets having a weight of less than about 25 pounds, to sit or lie on the central support portion 18. The device may be provided in different sizes, to accommodate different sized users. For example, the device may be sold in standard, large and child sizes, with the dimensions of the body scaled accordingly. For example, for a child size, the length $L_c$ may be from about 30-35 cm, and the depth D may be on the low end of the above range.

The wing portions wrap around the user's thighs, securely holding the body 12 in place. Preferably, the wing portions extend a sufficient distance down the sides of the user's thighs to provide good stability. For example, the length $L_w$ of each wing, measured from the lower surface 11 to the tip of the wing, is preferably at least 5 cm, e.g., from about 5 to 15 cm. The wings also act as "legs" for the device when the device is placed on a surface such as a table or deep windowsill.

Figure 4:
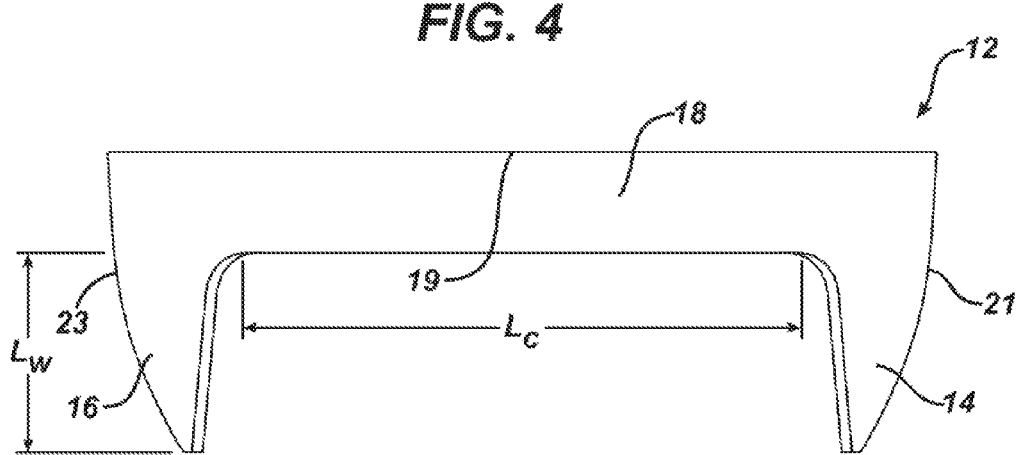

As shown in FIG. 4, the inner surfaces of the wings flare outwardly from the front edge 17 to the rear edge 19, to accommodate the greater width of the user's thighs closer to the user's hips. For example, the change in width from the front to rear edge can be from about 1 to 5 cm, for example from about 1.3 to 2.5 cm.

Figure 2:
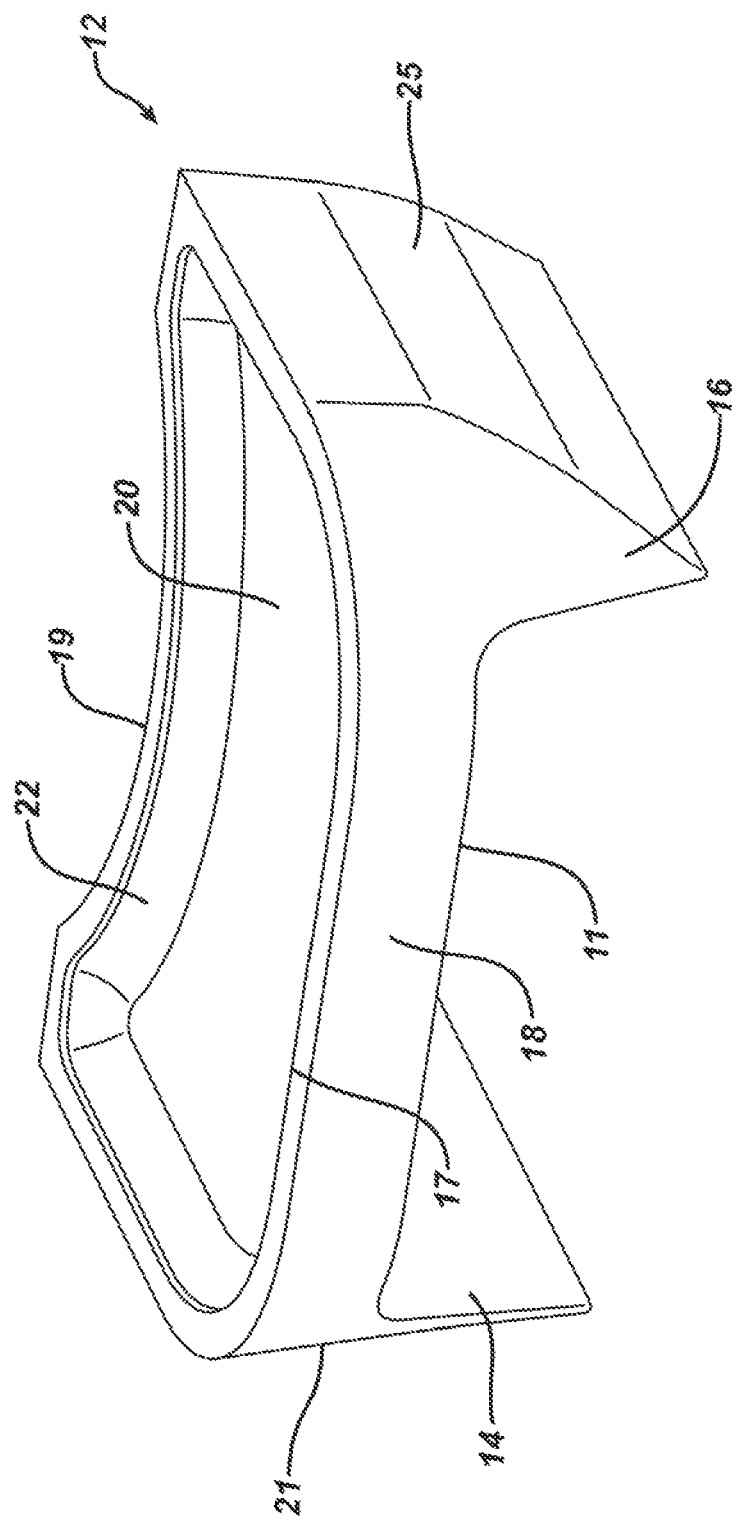
FIG. 2 is a perspective view of a lap support device according to one embodiment.

As can be seen in FIG. 2, the rear edge 19 includes a curved central portion, to conform to the user's torso and allow the body 12 to be comfortably positioned against the user's lower abdominal area. In some embodiments, the curved central portion has a radius of curvature of from about 20 to 25 cm, e.g., from about 21 to 23 cm.

The upper surface of the central support portion 18 includes a recessed area 20 which can serve as a bed for a pet, such as the cat shown in FIG. 1. Recessed area 20 includes a rim 22 extending around the circumference of the recessed area. The inner surface 23 of rim 22 is preferably smoothly curved, as shown in FIG. 5.

Rim 22 prevents the pet from slipping off of the device and generally makes it unnecessary for the user to hold onto the pet. The rim also provides some rigidity and racking strength to the body, preventing the body from excessive twisting when the device is moved. Referring to FIG. 5, the height H of the rim 22 above the surface of recessed area 20 is preferably at least 5 mm, and may be, for example, from about 5 to 50 mm, e.g., from about 10 to 30 mm.

The body 12 is formed of a resilient material. Suitable materials are comfortable to the user and the pet and allow the wing portions to be somewhat flexible, while also providing stable support for the pet. Preferably, the material is also sufficiently stiff to allow the device to be freestanding when placed on a surface. Suitable materials include foams, for example mold injected polyurethane foams and other types of resilient foams. The foam may be open or closed cell, and may have heat-dissipating properties. Suitable foams include those having a density of from about 3.0 to 4.0 pounds per cubic foot, and a firmness of from about 40 to 60 IFD, e.g., about 45 to 55 IFD. The foam may include a skin, e.g., skin 27 as shown in FIG. 5A. The body may be formed of recycled pre or post consumer materials, for example, textile scrap, recycled plastics, etc. In some embodiments the body material is organic-based, e.g., mushroom-based foam, soy-based foam, or other plant based foams.

Figure 5:
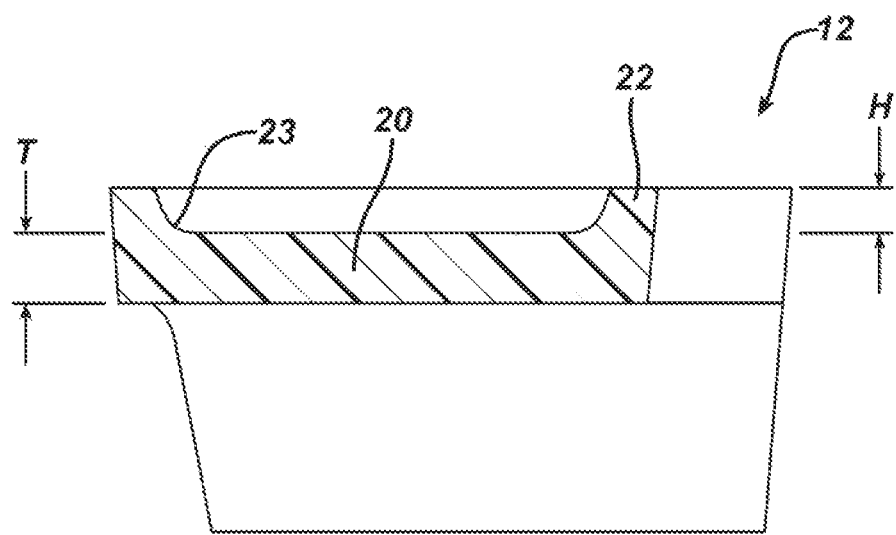
FIG. 5 is a cross-sectional view of the lap support device, taken along line 5-5 in FIG. 3.
Figure 5A:
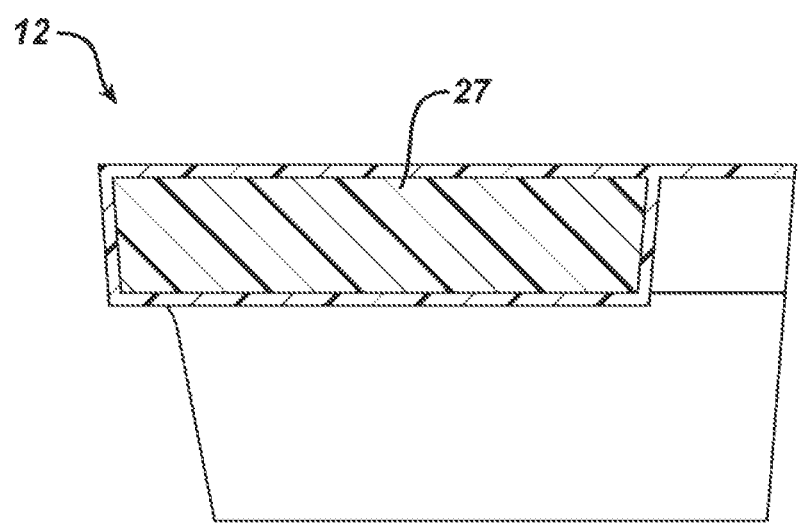
FIG. 5A is a cross-sectional view of a body having a coating or skin.

Referring to FIG. 5, the thickness T of the central support portion in the recessed area will depend in part on the physical properties of the material used to form body 12, but will generally be at least about 25 mm, and in some cases at least 35 mm, for example from about 25 to 80 mm. The thickness T is selected to provide adequate cushioning between the pet and the user's legs, and adequate support for the pet when the device is removed from the user's legs and placed on a surface. If a wedge is not provided with the device, the thickness T may need to be greater, and/or the material of the body may need to be stiffer.

The outer side surfaces 21, 23 of the wings are curved. The curvature of these surfaces provides some flexibility to the wing portions, and is comfortable to the user's arms. The curvature of the wings also helps the device to fit within the arms of a chair, e.g., an armchair, office chair or easy chair. The curved shape also facilitates manufacturing, e.g., removal of the device from a mold.

The lap support device 10 may also include a removable wedge 24 that is configured to be placed between the user's legs to further stabilize the body and to allow the user to relax and not feel the need to hold the device in place. The wedge can also help to support the central support portion 18 and prevent it from sagging in the middle when the device is removed from the lap and placed, with a pet on top, on a surface. Thus, it is generally preferred that the wedge extend approximately the same distance below the lower surface of the central support portion as the wings.

The wedge 24 may be removably attached to the body, for example by hook and loop fasteners. Suitable materials for the wedge include but are not limited to mold injected polyurethane foams, other types of resilient foams, or resilient materials formed from recycled or waste material. The wedge may be formed from the same material as the body or from a different material. The wedge may be somewhat higher foam firmness than the body, e.g., about 20 to 30% higher, to provide good support when the bed is placed on a hard surface. In some cases, the wedge may be formed of a loose material such as fiber fill, poly fill or other pillow stuffing material, with its shape being imparted by a cover or liner.

In some cases, the device includes a removable cover, for example a fabric cover 40 (FIG. 6) sewn to conform to the shape of the body. The cover may be secured on the body by any desired attachment technique, e.g., zipper, hook and loop fasteners, overlapping fabric portions, etc. Suitable fabrics include but are not limited to cotton/polyester, denim, denim/polyester, nylon blends, and polyester. Some covers will have waterproof or water resistant qualities. The cover preferably is configured to allow the wedge to be removably attached to the cover surface, e.g., using hook and loop fasteners. The wedge may also have a fabric cover, which may be removable for cleaning or may be permanently attached.

Figure 6:
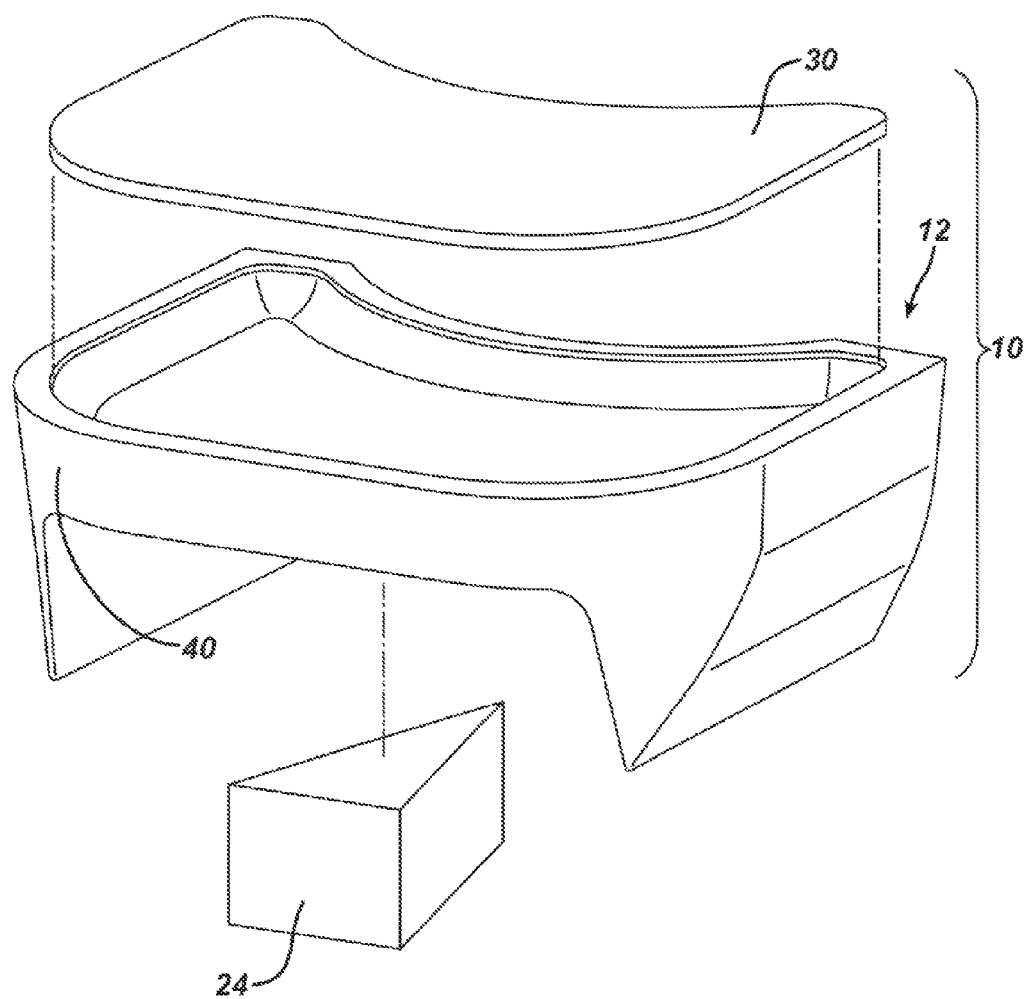
FIG. 6 is an exploded view of the lap support device of FIG. 2.
Figure 10:
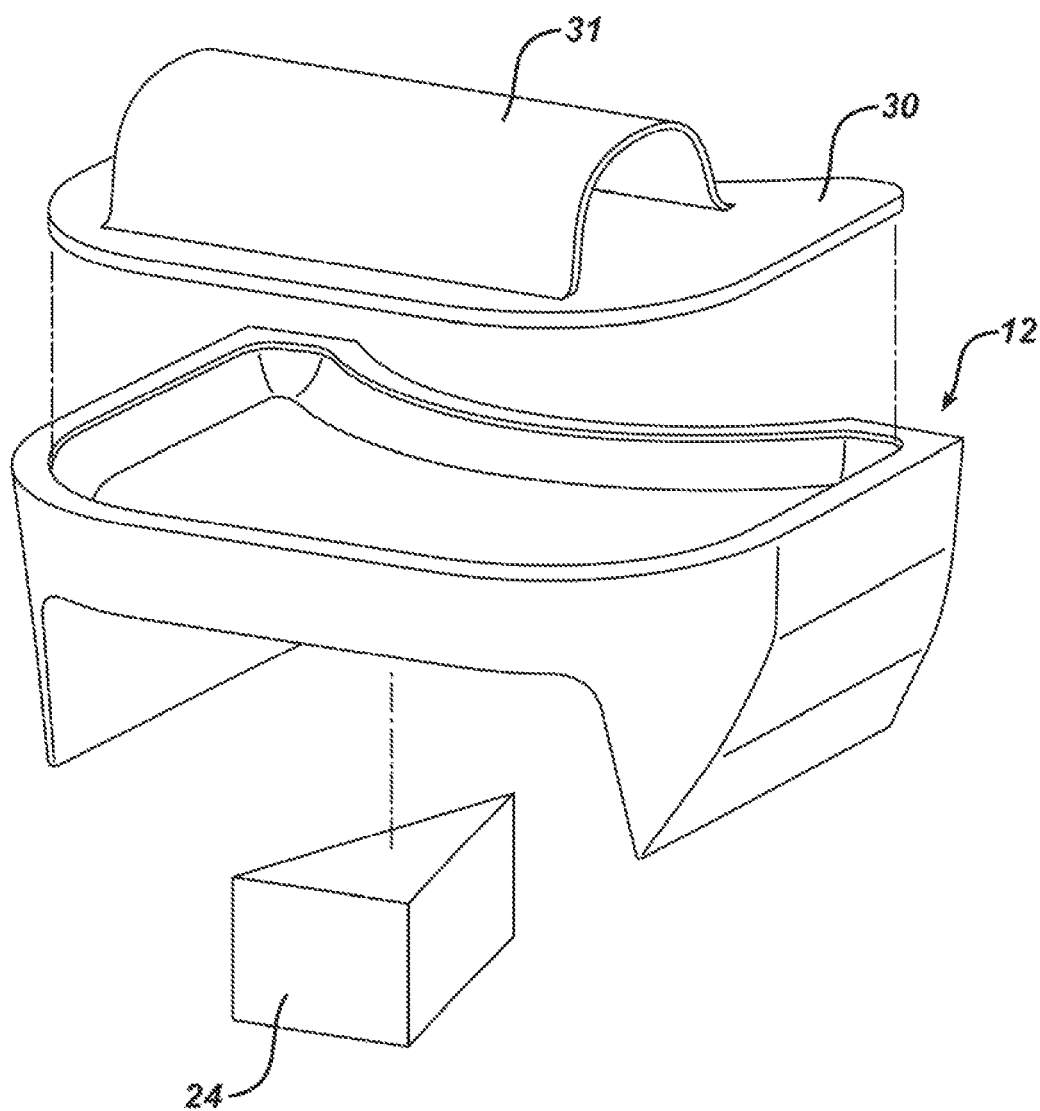
FIG. 10 is an exploded view of a lap support device according to an alternate embodiment.

Referring to FIG. 6, preferably the lap support device 10 further includes a removable topper 30 that is configured to be removably received in the recessed area 20. In the embodiment shown in FIG. 1, in which the lap support device 10 is used as a pet bed, the topper 30 is preferably a soft, flexible material that will be comfortable to the pet. The topper may be removably attached, e.g., with hook and loop fasteners, snaps or the like, or may just lay in the recessed area. Suitable materials for the topper include but are not limited to faux sheepskin, genuine sheepskin, faux fur, genuine fur, fleece, cotton, and other soft sheet materials. The topper may be of a material that a cat will enjoy kneading with its paws/claws. Because the topper is removable, different toppers of different materials may be used interchangeably. Referring to FIG. 10, in some implementations the topper may include a "tunnel" 31 into which the pet may crawl. This implementation may be particularly desirable for burrowing animals such as ferrets.

Figure 7:
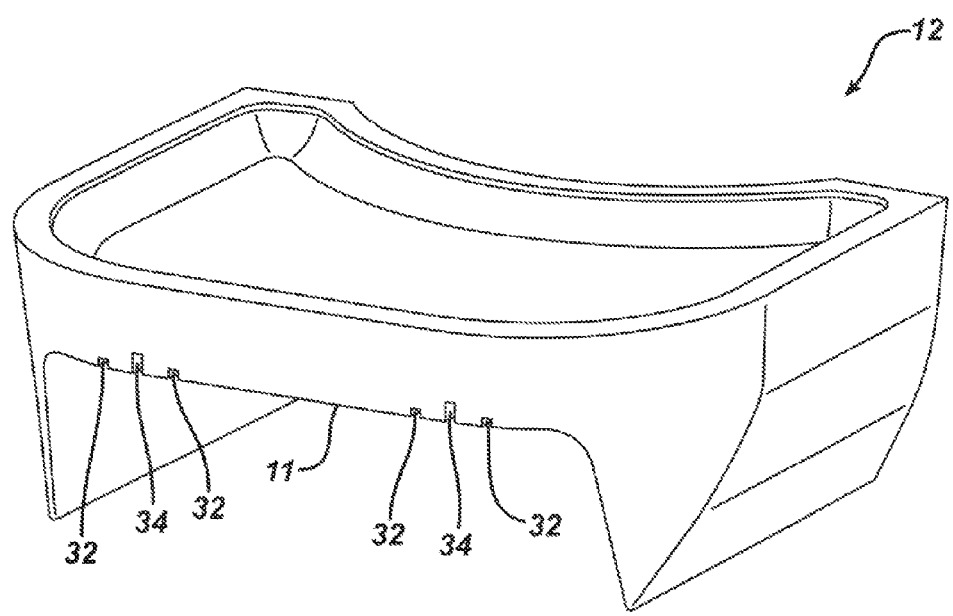
FIG. 7 is a perspective view of a body of a lap support device according to an alternate embodiment.
Figure 8:
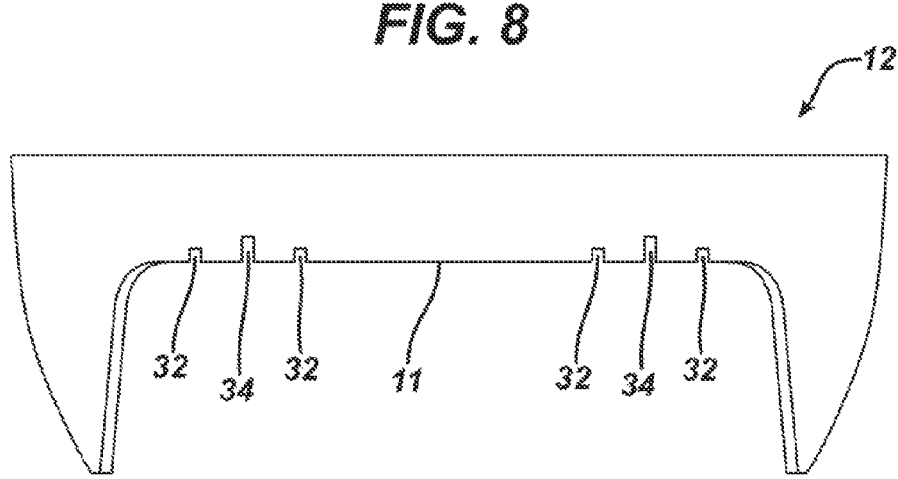
FIGS. 8 and 9 are front and bottom views, respectively, of the body shown in FIG. 7.
Figure 9:
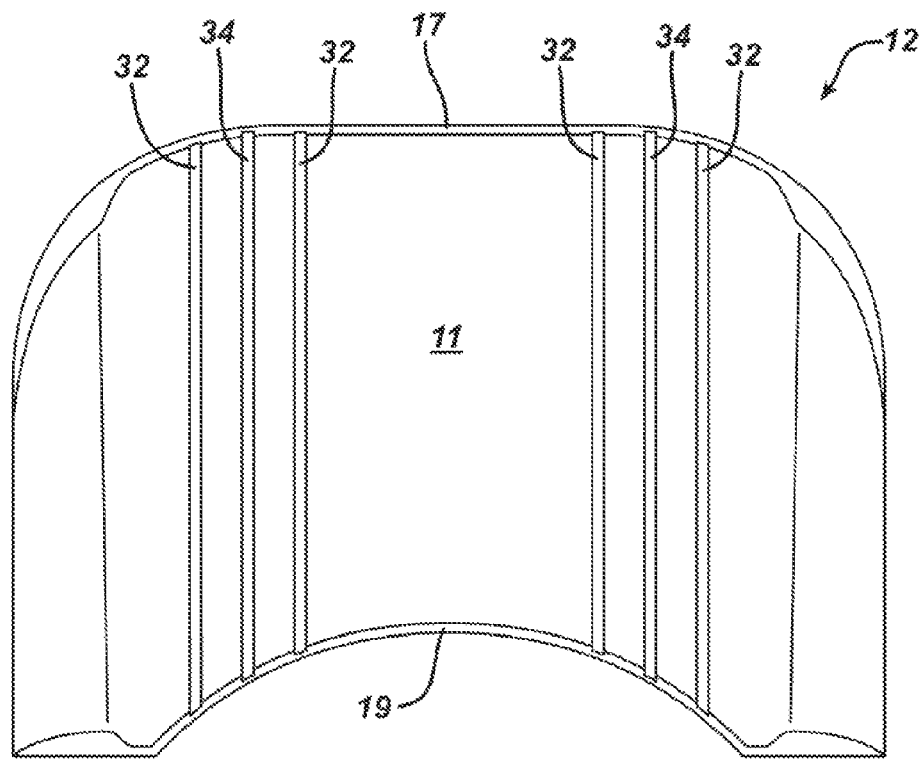

In some embodiments, e.g., as shown in FIGS. 7-9, the body 12 may include a plurality of heat-dissipating channels 32, 34 in lower surface 11. These channels are of a depth and width sufficient to allow airflow, while not being so deep as to compromise the structural rigidity of the central support portion 18 or so wide that the channel merely conforms to the user's thigh rather than providing an airspace. While this will vary depending upon the firmness of the foam, it is generally preferred that the channels be deeper than they are wide. For example, the depth to width ratio may be from about 1:2 to 1:3. In some implementations, the channels can have a depth of about 7 to 16 mm and a width of about 3 to 9 mm. In some cases, a spacing of about 15 to 25 mm is provided between adjacent channels. Preferably, the channels extend continuously from edge 17 to edge 19 of the body, as shown in FIG. 9, and there is a set of channels positioned to approximately align with the top of each of the user's thighs during use.

The central channel 34 of each set is deeper than the other two channels 32 that surround channel 34, for example from about 1.5 times deeper to about 3 times deeper. Because this channel is generally positioned above the center of the thigh, greater airflow is required in this area to accommodate greater heat generation. While two sets of three channels each are shown in FIGS. 7-9, more or fewer channels may be provided.

More or fewer channels can be provided. If too many channels are included, structural stability of the device may be compromised, while if too few channels are included in some cases too much heat may be retained against the user's legs. (Of course, this may not be disadvantageous, depending upon the climate where the device is used and other factors.)

Other Embodiments

A number of embodiments have been described. Nevertheless, it will be understood that various modifications may be made without departing from the spirit and scope of the disclosure.

For example, while the device is described above in the context of a support for a pet or other small animal, the device may be adapted to support items including, but not limited to, a plate of food, beverages, art projects (beadwork, knitting, scrapbooking, etc.), personal electronic devices (laptop, notebook or cell phone), video game controllers, or books. Other items include children's toys and various items that may be utilized by passengers in a car.

Advantageously, the device can shield the user's legs from the heat of a heat-generating personal electronic device, e.g., a laptop, particularly if heat-dissipating channels are included in the body as discussed above. In these embodiments, the soft topper discussed above can be replaced by a rigid or semi-rigid topper, for example one formed of plastic, wood, or other firm material.

Figure 11:
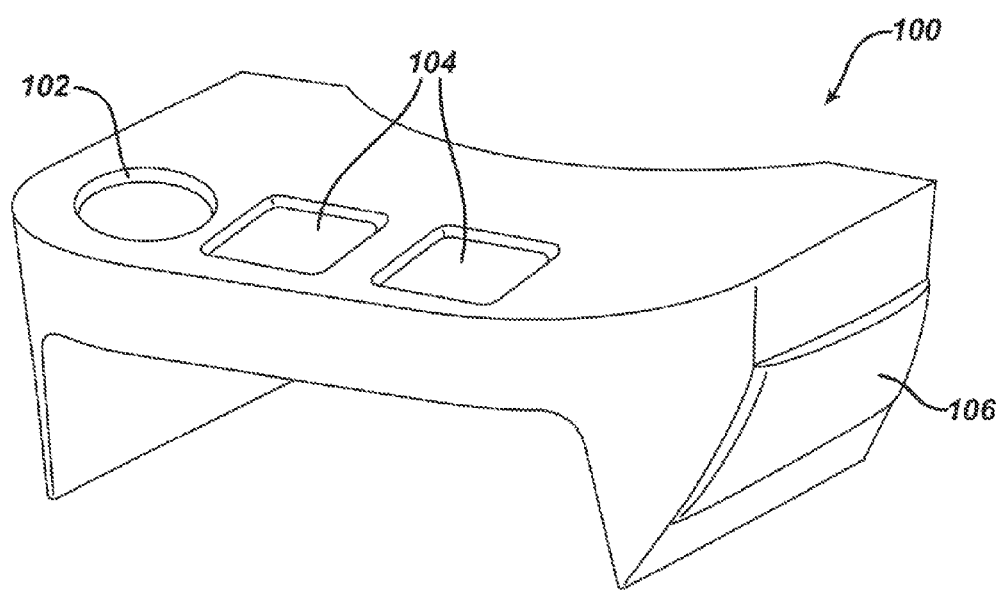
FIG. 11 is a perspective view of another alternate embodiment.

If desired, the body and/or the topper may be configured to include cup holders or compartments for storage of small objects, for example as shown in FIG. 11 in which device 100 includes a cup holder 102, two cubbies 104, and a side pouch 106. The cup holders may be in the form of an opening in the topper, which may or may not include a rim extending downward towards the body of the device. In some cases, storage may be provided between the topper and the upper surface of the central support portion.

As another example, while it is generally preferred that the wedge be removable, if desired the wedge could be integrally formed with the body. Moreover, if desired the wedge could have a different shape, e.g., could be contoured to the shape of the user's legs. In some implementations, the wedge may be omitted entirely.

In some implementations, the body or portions of the body may be inflatable, e.g., to allow the size of the device to be reduced for travel or storage.

In some cases, the body could be in the form of a loose fill material, and the shape of the body could be provided by the cover or a liner within the cover.

Accordingly, other embodiments are within the scope of the following claims.

What is claimed is:

1. A device comprising:
a body, formed of a resilient material, the body comprising
a central support portion having an upper surface that includes a generally planar region, and a lower surface;
a wedge-shaped element removably mounted on the lower surface; and
a pair of wing portions, disposed on opposite sides of the central supporting portion;
wherein the lower surface of the central support portion and inner surfaces of the wing portions define a generally U-shaped cavity dimensioned to be positioned over a user's thighs.

2. The device of claim 1 wherein the body further comprises a rim extending around a circumference of the central support portion.

3. The device of claim 2 wherein the rim extends at least 10 mm from the upper surface.

4. The device of claim 2 wherein the rim defines a recessed area.

5. The device of claim 4 further comprising a topper configured to be removably received in the recessed area.

6. The device of claim 5 wherein the topper is formed of a flexible material.

7. The device of claim 5 wherein the topper is formed of a rigid material.

8. The device of claim 4 wherein the rim has a height of from about 10 to 30 mm.

9. The device of claim 1 wherein the resilient material comprises a foam.

10. The device of claim 9 wherein the foam has a foam density of from about 3 to 4 pounds per cubic foot.

11. The device of claim 9 wherein the foam has a firmness of from about 40 to 60 IFD.

12. The device of claim 9 wherein the foam comprises a polyurethane.

13. The device of claim 1 wherein the wing portions have a length of at least 5 cm.

14. The device of claim 1 wherein the upper surface of the central support portion includes a curved edge.

15. The device of claim 1 wherein the central support portion has a thickness, measured from the upper surface to the lower surface, of at least 25 mm.

16. The device of claim 1 wherein the body further includes a plurality of heat-dissipating channels.

17. The device of claim 16 wherein the heat dissipating channels are positioned to align with the tops of a user's thighs when the device is in use.

18. A method comprising:
positioning a device on the lap of a human, the device comprising a body, formed of a resilient material, the body comprising (a) a central support portion having an upper surface that includes a generally planar region, and a lower surface; and (b) a pair of wing portions, disposed on opposite sides of the central supporting portion; wherein the lower surface of the central support portion and inner surfaces of the wing portions define a generally U-shaped cavity that us positioned over the human's thighs;
positioning a removable wedge-shaped element, mounted on the lower surface, between the human's thighs; and
positioning an animal on the upper surface of the central support portion.

19. The method of claim 18, further comprising placing a topper in a recessed area of the upper surface prior to positioning the animal on the upper surface.

20. The device of claim 1 wherein the wedge element is formed of a foam.

21. The device of claim 1 wherein the wedge element is mounted on the lower surface using hook and loop fasteners.

* * * * *